US011194966B1

(12) United States Patent
Appel et al.

(10) Patent No.: US 11,194,966 B1
(45) Date of Patent: Dec. 7, 2021

(54) MANAGEMENT OF CONCEPTS AND INTENTS IN CONVERSATIONAL SYSTEMS

(71) Applicant: INTERNATIONAL BUSINESS MACHINES CORPORATION, Armonk, NY (US)

(72) Inventors: Ana Paula Appel, São Paulo (BR); Claudio Santos Pinhanez, São Paulo (BR); Heloisa Caroline De Souza Pereira Candello, São Paulo (BR); Julio Nogima, São Paulo (BR); Maira Gatti de Bayser, Rio de Janeiro (BR); Mauro Pichiliani, São Paulo (BR); Melina de Vasconcelos Alberio Guerra, Rio de Janeiro (BR); Paulo Rodrigo Cavalin, Rio de Janeiro (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 24 days.

(21) Appl. No.: 16/917,564

(22) Filed: Jun. 30, 2020

(51) Int. Cl.
  *G06F 40/289* (2020.01)
  *G06F 40/30* (2020.01)
  *G06F 40/44* (2020.01)
  *G06F 40/268* (2020.01)
  *H04L 12/58* (2006.01)

(52) U.S. Cl.
  CPC .......... *G06F 40/289* (2020.01); *G06F 40/268* (2020.01); *G06F 40/30* (2020.01); *G06F 40/44* (2020.01); *H04L 51/02* (2013.01)

(58) Field of Classification Search
  CPC ........ G06F 40/289; G06F 40/44; G06F 40/30; G06F 40/268; H04L 51/02

USPC ............................................................ 704/9
See application file for complete search history.

(56) References Cited

U.S. PATENT DOCUMENTS

| 8,442,940 | B1* | 5/2013 | Faletti | G06F 16/367 |
| | | | | 707/610 |
| 9,727,642 | B2* | 8/2017 | Adderly | G06F 16/3346 |
| 10,509,672 | B2* | 12/2019 | Shear | G06F 16/245 |
| 10,540,205 | B2 | 1/2020 | Shear et al. | |
| 11,086,524 | B1* | 8/2021 | Sun | G06F 3/068 |
| 2006/0053098 | A1* | 3/2006 | Gardner | G06F 16/367 |
| 2006/0053099 | A1* | 3/2006 | Gardner | G06F 16/353 |
| 2006/0053151 | A1* | 3/2006 | Gardner | G06F 40/35 |

(Continued)

FOREIGN PATENT DOCUMENTS

CN       108874782 A      11/2018

OTHER PUBLICATIONS

Bonatti, P. A. et al., "Knowledge Graphs: New Directions for Knowledge Representation on the Semantic Web" Dagstuhl Reports (2018); vol. 8:9, pp. 1-92.

(Continued)

*Primary Examiner* — Edwin S Leland, III
(74) *Attorney, Agent, or Firm* — Intelletek Law Group, PLLC; Gabriel Daniel, Esq.

(57) ABSTRACT

A method of providing examples to a computerized conversation agent includes associating one or more triplets of two concepts and a relationship therebetween with an intent related to a query. The triplet is embedded in a knowledge graph and the concepts in the knowledge graph are mapped to the intent. A call log is scanned for examples of the intent based on the concepts in the knowledge graph and the examples are mapped to the intent.

20 Claims, 8 Drawing Sheets

(56) References Cited

U.S. PATENT DOCUMENTS

| | | | |
|---|---|---|---|
| 2006/0053171 A1* | 3/2006 | Eldridge | G06F 16/358 |
| 2006/0053172 A1* | 3/2006 | Gardner | G06N 5/02 |
| 2006/0053173 A1* | 3/2006 | Gardner | G06F 16/367 |
| 2006/0053174 A1* | 3/2006 | Gardner | G06F 16/353 |
| 2006/0074832 A1* | 4/2006 | Gardner | G06N 5/02 706/45 |
| 2006/0074833 A1* | 4/2006 | Gardner | G06N 5/02 706/45 |
| 2006/0074836 A1* | 4/2006 | Gardner | G06N 5/02 706/60 |
| 2009/0077113 A1* | 3/2009 | Fidaali | G06F 40/30 |
| 2017/0116204 A1* | 4/2017 | Davulcu | G06F 16/355 |
| 2017/0357625 A1* | 12/2017 | Carpenter | G06F 16/322 |
| 2019/0043500 A1* | 2/2019 | Malik | A63F 13/424 |
| 2019/0213259 A1* | 7/2019 | Bacarella | G06F 40/40 |
| 2019/0213260 A1* | 7/2019 | Bacarella | G06F 40/30 |
| 2019/0272296 A1* | 9/2019 | Prakash | G06F 16/243 |
| 2019/0286086 A1* | 9/2019 | Gardner | G16H 20/60 |
| 2019/0294673 A1* | 9/2019 | Sapugay | G06F 16/2465 |
| 2019/0294675 A1* | 9/2019 | Sapugay | G06F 40/30 |
| 2019/0295537 A1* | 9/2019 | Sapugay | G06N 5/025 |
| 2019/0370650 A1* | 12/2019 | Wheeler | A61B 5/389 |
| 2021/0019309 A1* | 1/2021 | Yadav | G06F 16/245 |
| 2021/0210170 A1* | 7/2021 | Gardner | G16H 20/60 |

OTHER PUBLICATIONS

Dietz, L. et al., The Second Workshop on Knowledge Graphs and Semantics for Text Retrieval, Analysis and Understanding (KG4IR); SIGIR (2018); 4 pgs.

Anonymous, "Constraint Driven Dialog: Systems & Methods" IP.com (2019); 7 pgs.

Anonymous, "Adapting Conversation Based on Perceived User Expertise"; IP.com (2019); 5 pgs.

Anonymous, "Method and System for Providing Multi-layer Intent Representation and Automatic Conversation Generation Using Machine Learning"; IP.com (2018); 5 pgs.

* cited by examiner

MANAGEMENT OF CONCEPTS AND INTENTS IN CONVERSATIONAL SYSTEMS

BACKGROUND

Technical Field

The present disclosure generally relates to conversational artificial intelligence computer systems and software for use therewith, and more particularly, to methods and systems for supporting the management of concepts and intents in conversational systems.

Description of the Related Art

The intent-action paradigm used today by computerized conversational systems, such as the IBM Watson Assistant (WA) framework, involves chatbot developers to provide an extensive list of examples for each intent used in the system. Medium and large-scale dialog systems can include thousands of intents. Chatbot developers/domain experts typically manually match sentences in a call log to an intent, new or from an existent large collection of intents. Finding examples from chat logs or human-to-human call logs does not work well or is time-consuming and prone to errors.

Domain experts (DEs), off-line, define the intents of possible user utterances through a list (e.g., >10) of examples or can also ask the system for recommendations, and then define entities. The examples are processed by the conversational system and a mapping from user utterances to intents is learned. For each intent, the DE associates an action, a manually written answer or computer program, using entities. In each action, the DE can also define follow-up intents. During runtime, the conversational system maps the user utterance into its corresponding intent and provides the associated action. Periodically, DEs fix problems by providing more examples and creating new or modifying existing intents.

SUMMARY

According to various embodiments, a computing device, a non-transitory computer readable storage medium, and a method are provided for improving a computerized conversation system. The method includes associating one or more triplets of two concepts and a relationship therebetween with an intent related to a query. The one or more triplets are embedded in a knowledge graph. The two concepts in the knowledge graph are mapped with the intent. A call log is scanned for examples of the intent based on the concepts in the knowledge graph and the examples that are found are mapped to the intent.

In one embodiment, a single concept in the knowledge graph is mapped to one or more intents.

In one embodiment, the method further includes creating a second knowledge graph having string data prior to embedding in the knowledge graph. In one embodiment, the string data of the second knowledge graph is embedded into the knowledge graph by encoding. In one embodiment, the string data of the second knowledge graph is embedded into the knowledge graph by word embeddings.

In one embodiment, the method further includes, for each example found in the call log, extracting one or more example triplets of two example concepts and an example relationship therebetween and searching each of the two example concepts and the example relationship in the knowledge graph for the intent.

In one embodiment, the method further includes determining conflicts between two or more of the intents based on associated ones of the concepts mapped thereto.

In one embodiment, the method further included providing the intent and the examples mapped thereto, to a computerized conversation agent.

In one embodiment, the method further includes sending suggesting the examples to a user interface of a domain expert before mapping the examples to the intent.

According to various embodiments, a computing device is provided for a computerized conversation system comprising a computerized conversation agent configured to receive a query from an end user and output an answer to the end user and a builder module. The builder module includes a user interface permitting a domain expert to define an intent by one or more triplets of two concepts and a relationship therebetween. The builder module further includes a concept manager configured to manage a knowledge graph having the one or more triplets embedded therein, and to map the two concepts to the intent. The builder module further includes an example finder configured to search a call log for examples of the intent defined by one or more triplets and provides such examples, as mapped to the intent, to the computerized conversation agent.

By virtue of the concepts discussed herein, a tool is provided that improves upon the transfer of knowledge to a computerized conversation system. These concepts can assure expressiveness, scalability and efficiency of such conversation systems and further enable the finding of conflicts and interferences among sets of intents, while supporting the search of knowledge areas which are not covered by the existing intents.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1:
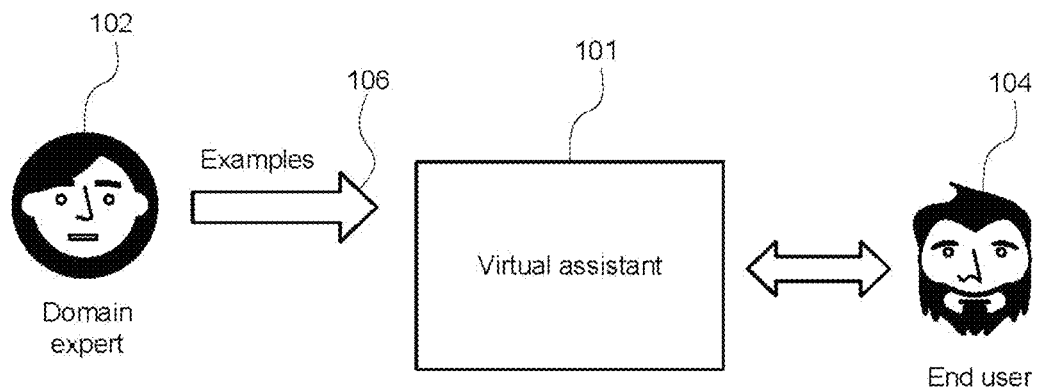
FIG. 1 is a graphical representation of the interactions of a domain expert and an end user with a computerized conversational system.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As discussed in greater detail below, the present disclosure generally relates to systems and computerized methods of transferring knowledge to a computerized conversational system. The systems and computerized methods provide a technical improvement in the efficiency and accuracy of computer systems by speeding up the creation, deployment, integration and reuse of concepts identified in call logs and mapped to intents within a computerized conversational system. The systems and computerized methods can assure expressiveness, scalability, and efficiency in computerized conversational systems by using knowledge graphs for concept representation and manipulation. The systems and computerized methods can enable finding conflicts and interferences among a set of intents and support the search of knowledge areas which are not covered by the existing intents.

As used herein, a "computerized conversational system", or a "virtual assistant" refers to an intent-based conversation artificial intelligence system that can derive an intent from an end user's query and provide a predetermined answer based on that intent. An "intent" refers to the motive of an end user. It is the intention behind each message that the computerized conversational system receives. Intent relates to what the user wants to get out of the interaction. For example, if an end user asks, "What does it cost for making a late payment", the system can determine the intent behind the message is to check the user's account information and provide the late payment fee for that account. Therefore, an intent-based computerized conversational system can operate to identify the meaning the message from the end user is trying to convey, instead of relying on the specific input.

An intent-based computerized conversational system looks for key terms and "entities" in the messages it receives. Entities are variables that inform the intent of the message. For example, a user can ask the system, 'What will the weather be like in New York on Friday?' The intent is to find out the weather. The terms "New York" and "Friday" are entities which specify the information the user seeks.

Reference now is made in detail to the details illustrated in the accompanying drawings and discussed below.

Referring to FIG. 1, a virtual assistant 101, also referred to as a computerized conversational agent 101, or simply, agent 101, can interact with an end user 104 to automatically answer queries posted to the agent 101. A domain expert 102 is responsible for reviewing call logs based on interactions between the end user 104 and the agent 101 and extracting examples 106 therefrom.

Figure 2:
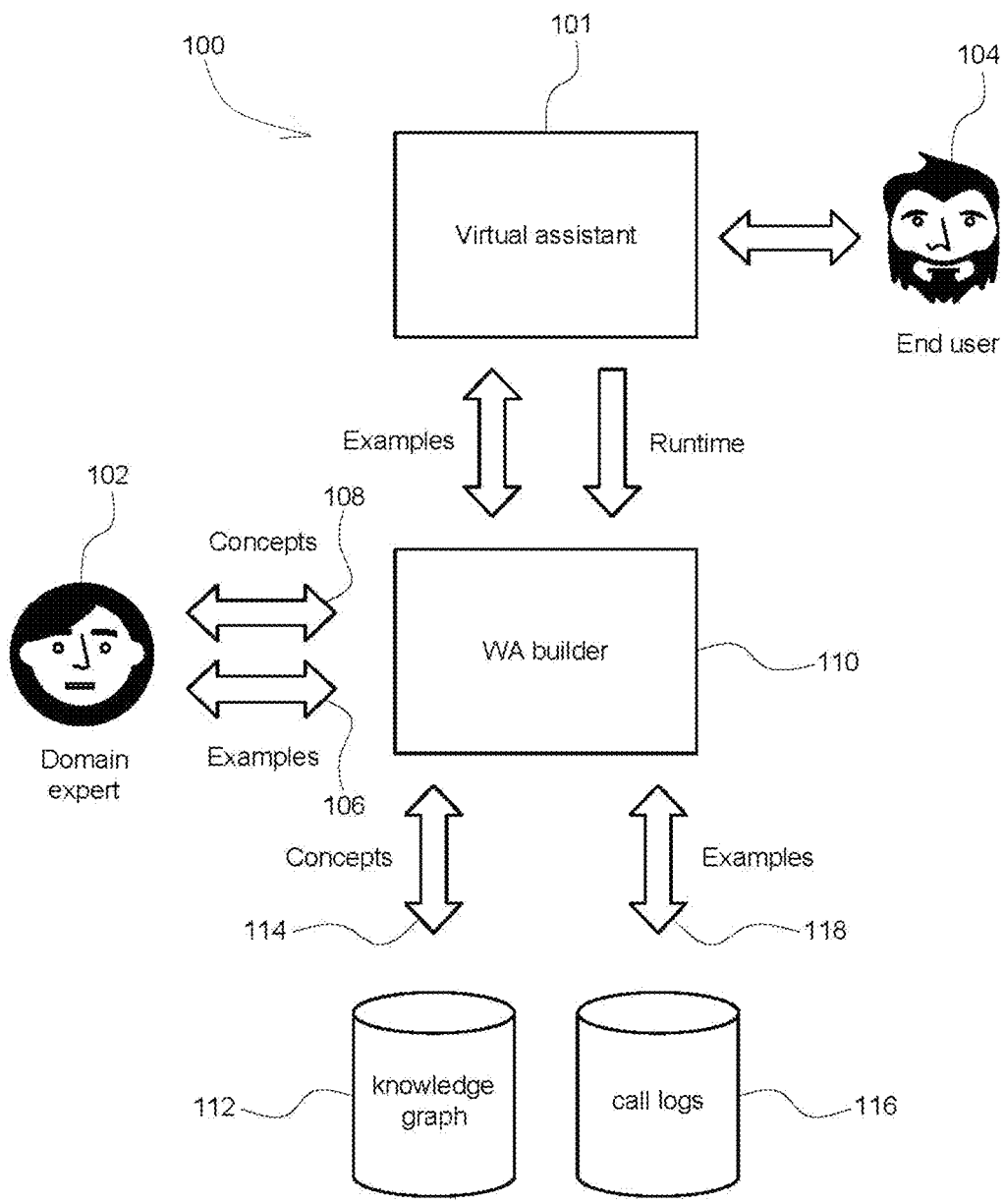
FIG. 2 is a graphical representation of the interaction of a domain expert, end user, and a conversational system builder with a computerized conversational system, consistent with an illustrative embodiment.

Referring now to FIG. 2, computerized conversational system 100 can include a builder 110 that can interface between the domain expert 102 and the agent 101. As described in greater detail below, the builder 110 can interact with the domain expert 102 using concepts 108 and examples 106 and, through this interaction, can build and maintain a knowledge graph 112 to represent and store the concepts 114. Then, following a request by the domain expert 102, the builder 110 can use the concepts 114 stored in the knowledge graph 112 to find examples 118 from call logs 116 and automatically create or update intents used by the agent 101 to interact with the end user 104.

The builder 110 can permit the domain expert 102 to visualize the existing examples 106 for the intents. Through this mechanism, the domain expert 102 can find conflicts and interferences among a set of intents. As the computerized conversational system 100 learns new intents based on examples, some examples may map to intents that are incorrect or conflicting with other examples. Accordingly, through the builder 110, the domain expert 102 can visualize the examples 106 and provide updates if required.

As described in greater detail below, the builder 110 can be used to retrieve a list of suggested examples from a call log; to visualize the literal representation of concepts and their semantic relationships from a subgraph of a knowledge graph; to visualize the list of terms and semantic related terms or relationships, as well as the list of existent examples and suggested examples; to differentiate, for each entity the existing content to new content, to add, update or remove new content from the knowledge graph, including nodes, edges, intents and examples; and to chat test utterances to the agent 101.

Figure 3:
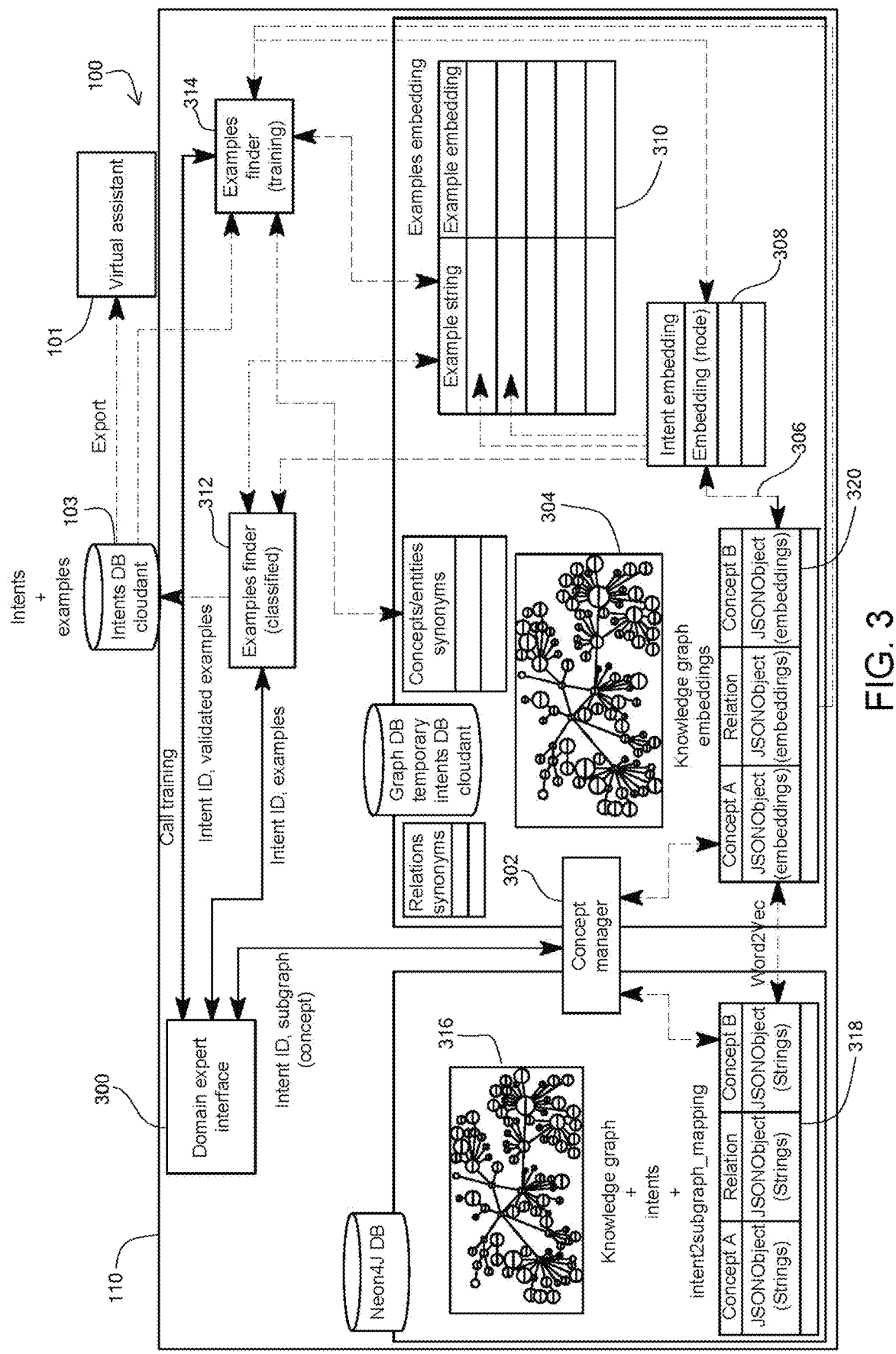
FIG. 3 is a detailed representation of aspects of the conversational system builder of FIG. 2, consistent with an illustrative embodiment.
Figure 4:
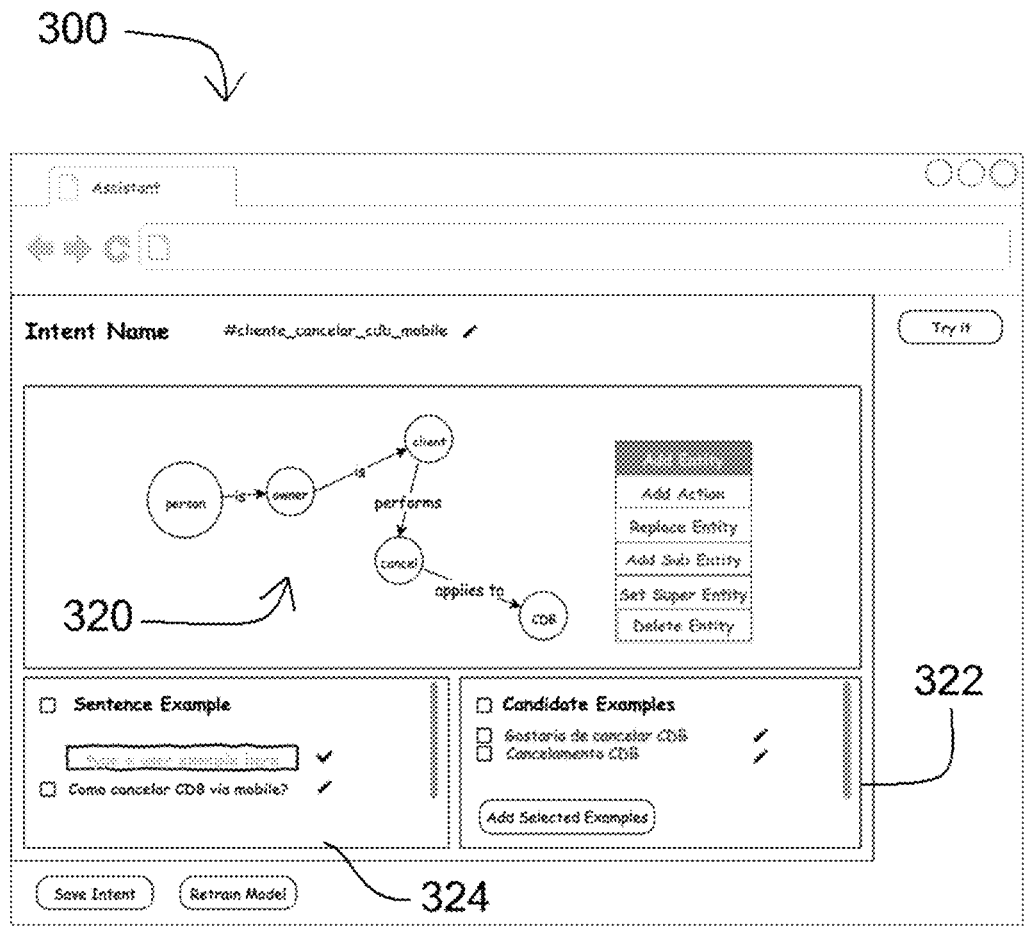
FIG. 4 is a flow chart illustrating random walk knowledge graph embedding that can be used in the conversational system builder of FIG. 2, consistent with an illustrative embodiment.
Figure 5:
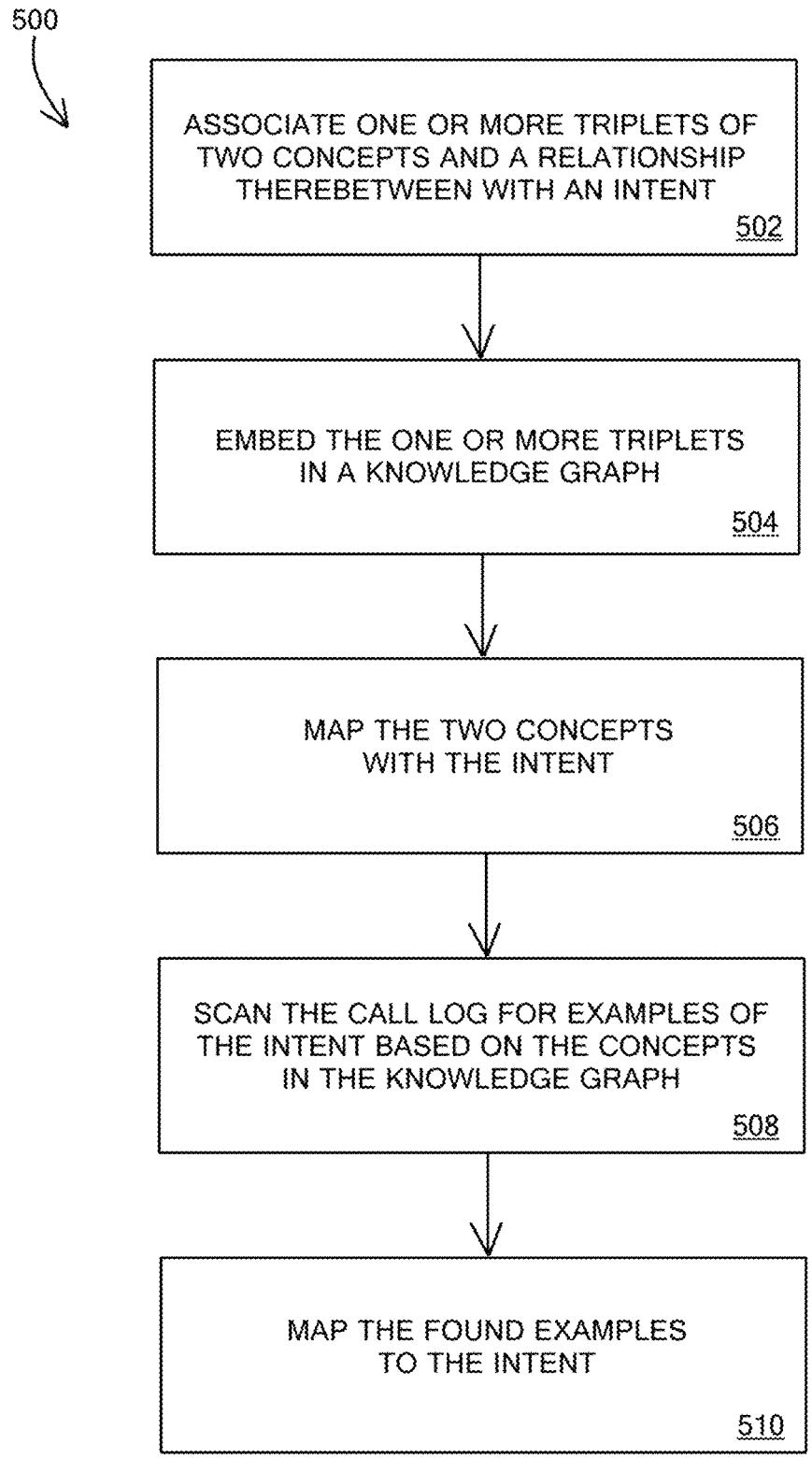
FIG. 5 is flow chart illustrating an exemplary method consistent with an illustrative embodiment.

Referring to FIGS. 3 and 4, details of the builder 110 are shown, along with its interaction with the computerized conversational system 100, with its associated database 103 including intents and examples. The builder 110 includes a user interface 300 that allows the domain expert 102 (see FIG. 2) to define, explore and reuse concepts, and to provide and check examples of the concepts, intuitively and efficiently through semantic knowledge graphs as shown in FIG. 4, discussed below.

The builder 110 can further include a concept manager 302 that manages the knowledge graph 304 and its mapping 306 into the intents 308 and examples 310. The concept manager 302 further provides support for queries and updates from the domain expert through the user interface 300.

The builder 110 can further include an example finder 312 that, given a new intent by the domain expert, defined by concepts and a few examples, searches for examples in the call log. A training example finder 314 may be provided to permit the domain expert, via the user interface 300, to review the examples associates with an intent and make appropriate edits in order to help direct the example finder 312 to retrieve appropriate examples from the call log.

The builder 110 simplifies the process of identifying new intents by defining them at a high level by the use of concepts and relationships between them. Domain experts can associate basic concepts, such as "payment," "late," and "fee" to an intent related to questions about late fee payments and the builder 110 could use those concepts to scan the call logs and automatically gather examples of such an intent. Examples of the use of the builder 110 are discussed below.

As shown in FIG. 4, the user interface 300 can allow the domain expert to see the intent subgraph 320, edit the subgraph 320 and update the knowledge graph with the edited subgraph 320. Once the domain expert updates the knowledge graph, the concept manager 302 can update the candidate examples 322 based on the user changes in the subgraph 320. The domain expert can then add selected ones of the candidate examples 322 to the sentence examples 324. The training example finder 314 can then retrain the example finder 312 and suggest new candidate examples from the call logs.

The builder can include a knowledge graph 316 with concepts and relations 318 defined as strings and a knowledge graph 304 with concepts and relations embedded 320 therein. These embedded concepts and relations 320 can be linked to the embedded intents 308 and the embedded examples 310 as shown in FIG. 3.

Figure 6:
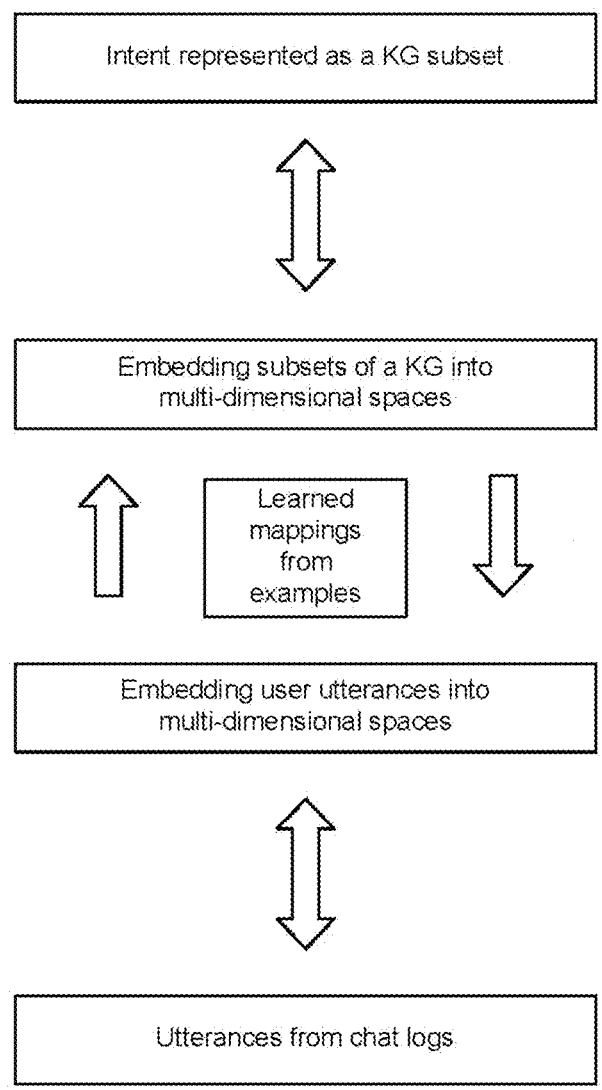
FIG. 6 is a flow chart illustrating random walk knowledge graph embedding that can be used in the conversational system builder of FIG. 2, consistent with an illustrative embodiment.
Figure 7:
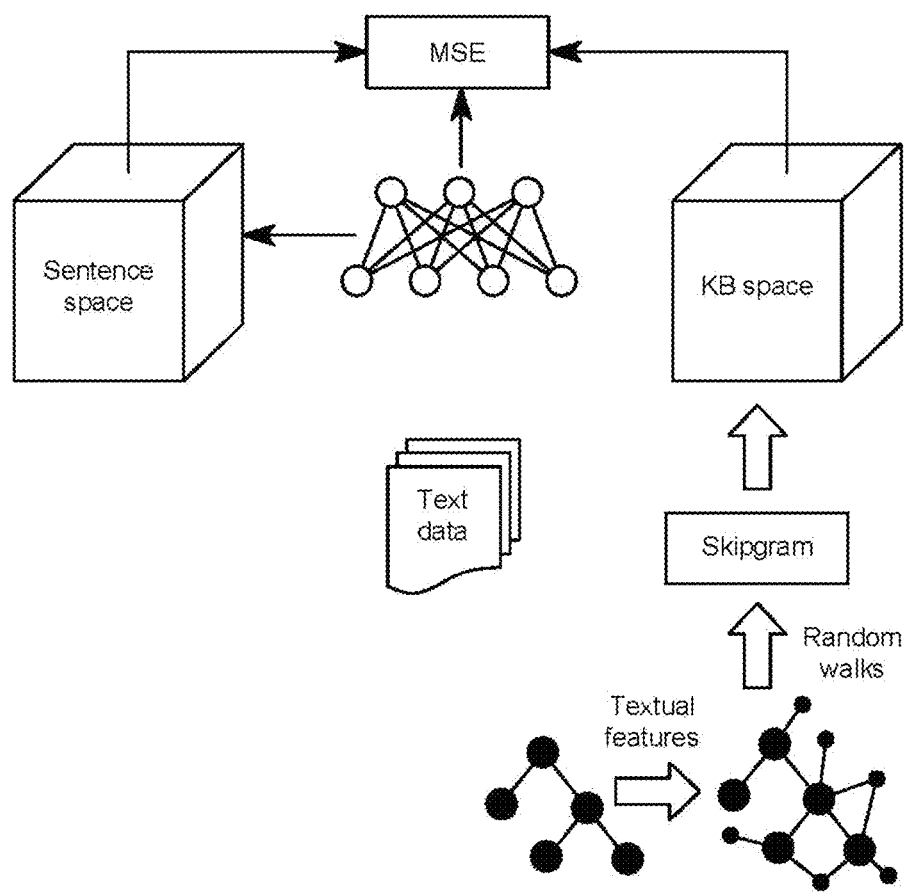
FIG. 7 is an illustration of one method for mapping text to knowledge graph entities.

Various methods can be used to embed knowledge graph with textual features. Referring to FIGS. 6 and 7, a method of embedding knowledge graph random walks with textual features is shown. Textual features from a knowledge subgraph can be incorporated into the knowledge graph space via random walks processed by a Skip-gram algorithm. The mean square error (MSE) can be determined between the sentence space and the knowledge graph-based space. Utterances from chat logs can be used to provide the text data from which the textual features are derived. In FIG. 4, the learned mappings from the examples can be determined via the mean square error as illustrated in FIG. 6. FIGS. 6 and 7 provide one such method and other methods, as may be known by one skilled in the art, are contemplated within the scope of the present disclosure. In FIG. 6 it is presented a high-level overview of how the utterances or sentences can be mapped to a knowledge graph. The subgraph associated to the intent is converted to a multi-dimensional space, usually known as the graph embedding space, by means of, for instance, machine learning or matrix factorization methods. On the other side, the utterance is also converted to a multi-dimensional space, normally known in this case as the sentence embedding space. Then, a learned model maps the sentence embedding of a given input utterance to the graph embedding that is supposedly the one the associates best with that utterance. That best-matching graph embedding can be used to recover the intent that best matches the input utterance. FIG. 7 then provides an illustration of an exemplary training workflow for the mapping model in the center of FIG. 6. On the sentence space side, any sentence embedding method can be used, such as Word Embeddings, BERT, TFIDF, and the like. On the graph embedding side, some method such as DeepWalk, Node2Vec, and the like, can be used to generate embedding from the knowledge graph. On that, the intent can be represented, for instance, by a sole node, connected to other entities or intents, by a subgraph or by an entire graph, provided each intent has its own graph.

The knowledge graph can also be enhanced with low-level information such as textual features. In the case that the mapping model includes a machine learning model, it can be learned by means of a learning algorithm that minimizes a criterion as the mean squared error (MSE), considering the sentence embeddings as input and the graph embeddings as output, or vice-versa.

Example Process

One example of the use of embodiments of the present disclosure is described below. If a user states to the computerized conversational system, "I would like to invest in CDB," the following concepts would be detected: one representing the subject, which is the client, one representing the verb, which is "to invest" and one representing the verb direct object, which is the noun "CDB.". Each of those concepts are related as follows: the concept representing the client is related to the concept representing the "to invest", which, in turn, is related to the concept representing the "CDB."

The intrinsic semantic association between two concepts is mapped to a set of high-level relations in order to reduce the number of relations in the knowledge graph. For these examples, the detected triples are then ((("client"), ("asks"), ("to invest")) and (("to invest"), ("applies to"), ("CDB")). Because the unique identifier of the intent is associated across all triples detected in all examples, the structure of the concepts and relations includes that information in a field. Therefore, the concepts and relations can be reused between different intents, which contributes for finding conflicts and interferences among a set of intents in the user interface. This also helps the domain expert to support the search of knowledge areas that are not covered by the existing intents.

For each new example that can be added by the domain expert to an intent through the user interface or suggested by the example finder and the domain expert asked to add it, one or more triples as defined above are extracted and each node and each relationship in the triple is searched in the knowledge graphs for the given intent. As shown in FIG. 3, in order to improve the search, the concept manager manages two knowledge graphs 304, 316. One knowledge graph 316 that includes structures of strings and one knowledge graph 304 that includes structures of encoded information related to the corresponding strings. As discussed above, the present disclosure is not constrained to the encode method implementation which could be, for instance, with word embeddings, such as word2vec citation.

Figure 8:
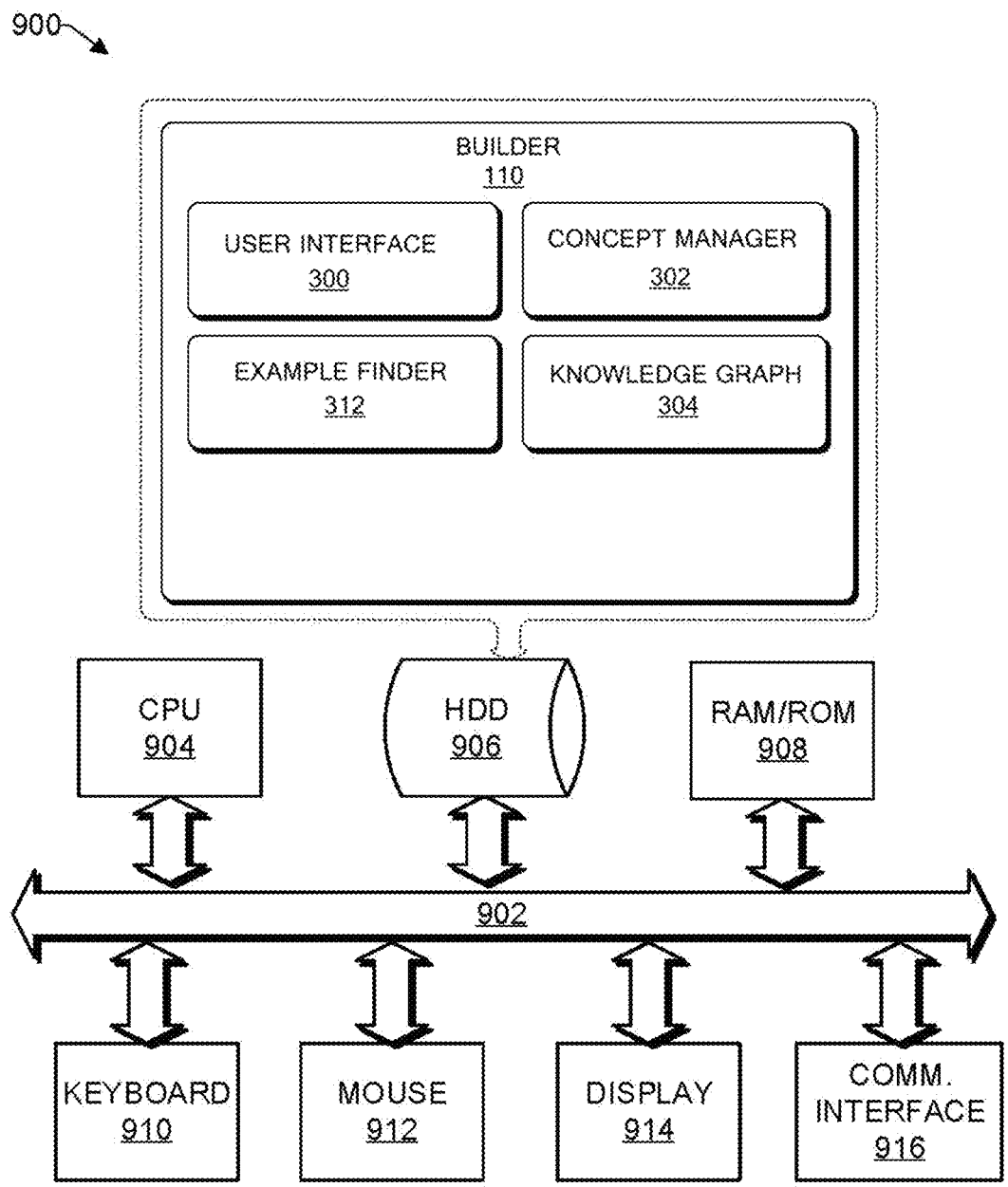
FIG. 8 is a functional block diagram illustration of a computer hardware platform that can be used to implement a particularly configured computing device that can host a conversational system builder consistent with an illustrative embodiment.

FIG. 8 provides a functional block diagram illustration of a computer hardware platform 900 that can be used to implement a particularly configured computing device that can host a builder for a computerized conversation system, such as builder 110 described above. In particular, FIG. 8 illustrates a network or host computer platform 900, as may be used to implement an appropriately configured builder, such as the builder 110 described above in FIG. 3.

The computer platform 900 may include a central processing unit (CPU) 904, a hard disk drive (HDD) 906, random access memory (RAM) and/or read only memory (ROM) 908, a keyboard 910, a mouse 912, a display 914, and a communication interface 916, which are connected to a system bus 902.

In one embodiment, the HDD 906, has capabilities that include storing a program that can execute various processes, such as the builder 110, in a manner described herein. The builder 110 may have various modules configured to perform different functions. For example, there may be a user interface 300, the concept manager 302, the example finder 312, and the knowledge graph 304, as described above with respect to FIG. 3.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method comprising:
    associating one or more triplets of two concepts and a relationship therebetween with an intent related to a query;
    embedding the one or more triplets in a knowledge graph;
    mapping the two concepts in the knowledge graph with the intent;
    scanning a call log for examples of the intent based on the concepts in the knowledge graph; and
    mapping the examples to the intent.

2. The computer implemented method of claim 1, wherein a single concept in the knowledge graph is mapped to one or more intents.

3. The computer implemented method of claim 1, further comprising creating a second knowledge graph having string data prior to embedding in the knowledge graph.

4. The computer implemented method of claim 3, wherein the string data of the second knowledge graph is embedded into the knowledge graph by encoding.

5. The computer implemented method of claim 3, wherein the string data of the second knowledge graph is embedded into the knowledge graph by word embeddings.

6. The computer implemented method of claim 1, further comprising:
    for each example found in the call log, extracting one or more example triplets of two example concepts and an example relationship therebetween; and
    searching each of the two example concepts and the example relationship in the knowledge graph for the intent.

7. The computer implemented method of claim 1, further comprising determining conflicts between two or more of the intents based on associated ones of the concepts mapped thereto.

8. The computer implemented method of claim 1, further comprising providing the intent and the examples mapped thereto, to a computerized conversation agent.

9. The computer implemented method of claim 1, further comprising sending the examples to a user interface of a domain expert before mapping the examples to the intent.

10. A computerized conversation system comprising:
    a computerized conversation agent configured to receive a query from an end user and output an answer to the end user; and
    a builder module comprising:
        a user interface permitting a domain expert to define an intent by one or more triplets of two concepts and a relationship therebetween;
        a concept manager configured to manage a knowledge graph having the one or more triplets embedded therein, and to map the two concepts to the intent; and
        an example finder configured to search a call log for examples of the intent defined by one or more triplets and provide the examples, as mapped to the intent, to the computerized conversation agent.

11. The computerized conversation system of claim 10, wherein a single concept in the knowledge graph is mapped to one or more intents.

12. The computerized conversation system of claim 10, further comprising a second knowledge graph having string data prior to the embedding in the knowledge graph.

13. The computerized conversation system of claim 10, wherein one or more conflicts between two or more of the intents based on associated ones of the concepts mapped thereto are displayed to the domain expert via the user interface.

14. The computerized conversation system of claim 10, wherein the user interface displays the examples to the domain expert for approval prior to providing the examples to the computerized conversation agent.

15. A non-transitory computer readable storage medium tangibly embodying a computer readable program code having computer readable instructions that, when executed, causes a computer device to carry out a method of improving computing efficiency of a computing device for problem solving and reasoning, the method comprising:
    associating one or more triplets of two concepts and a relationship therebetween with an intent related to a query;
    embedding the one or more triplets in a knowledge graph;
    mapping the two concepts in the knowledge graph with the intent;
    scanning a call log for examples of the intent based on the concepts in the knowledge graph; and
    mapping the examples to the intent.

16. The non-transitory computer readable storage medium of claim 15, wherein the execution of the code by the processor further configures the computing device to perform an act comprising mapping a single concept in the knowledge graph to one or more intents.

17. The non-transitory computer readable storage medium of claim 15, wherein the execution of the code by the processor further configures the computing device to perform an act comprising:
    for each example found in the call log, extracting one or more example triplets of two example concepts and an example relationship therebetween; and
    searching each of the two example concepts and the example relationship in the knowledge graph for the intent.

18. The non-transitory computer readable storage medium of claim 15, wherein the execution of the code by the processor further configures the computing device to perform an act comprising determining conflicts between two or more of the intents based on associated ones of the concepts mapped thereto.

19. The non-transitory computer readable storage medium of claim 15, wherein the execution of the code by the processor further configures the computing device to perform an act comprising suggesting the examples to a domain expert before mapping the examples to the intent.

20. The non-transitory computer readable storage medium of claim 15, wherein the execution of the code by the processor further configures the computing device to perform an act comprising providing the intent and the examples mapped thereto, to a computerized conversation agent.

* * * * *